United States Patent
Castonguay et al.

(10) Patent No.: US 7,379,061 B2
(45) Date of Patent: May 27, 2008

(54) METHOD AND SYSTEM FOR FAULT ISOLATION WITHIN A NETWORK ELEMENT IN AN OPTICAL NETWORK

(75) Inventors: Arthur Emery Castonguay, Ottawa (CA); John Frederick Groves, Ottawa (CA)

(73) Assignee: Alcatel-Lucent Canada Inc., Ottawa, Ontario (CA)

( * ) Notice: Subject to any disclaimer, the term of this patent is extended or adjusted under 35 U.S.C. 154(b) by 552 days.

(21) Appl. No.: 10/986,347

(22) Filed: Nov. 12, 2004

(65) Prior Publication Data

US 2005/0099419 A1 May 12, 2005

Related U.S. Application Data

(60) Provisional application No. 60/518,629, filed on Nov. 12, 2003.

(51) Int. Cl.
*G06T 17/00* (2006.01)

(52) U.S. Cl. ............ 345/420; 345/419; 345/423; 345/428; 345/440; 345/441; 714/4; 370/241; 370/242; 709/224

(58) Field of Classification Search ........... 345/420, 345/440, 419, 423, 428, 441
See application file for complete search history.

(56) References Cited

U.S. PATENT DOCUMENTS

| | | | |
|---|---|---|---|
| 6,414,595 B1 * | 7/2002 | Scrandis et al. ........... | 340/506 |
| 6,707,795 B1 * | 3/2004 | Noorhosseini et al. ...... | 370/242 |
| 7,043,661 B2 * | 5/2006 | Valadarsky et al. ......... | 714/4 |

* cited by examiner

*Primary Examiner*—Kimbinh T Nguyen
(74) *Attorney, Agent, or Firm*—Victoria Donnelly; IP-MEX Inc.

(57) ABSTRACT

A method and system for fault isolation within a network element in an optical network is described. A single fault in the system can give rise to multiple alarms detected at multiple points. Finding the root cause alarm corresponding to the fault that has triggered these alarms is important for fault isolation and is the focus of attention for this invention. The network element is modeled by a directed acyclic graph that captures the interactions among various components in the network element. Using a graph-based technique the invention analyzes the various topological faults raised and their locations for identifying root cause alarms and masking all correlated alarms.

23 Claims, 7 Drawing Sheets

METHOD AND SYSTEM FOR FAULT ISOLATION WITHIN A NETWORK ELEMENT IN AN OPTICAL NETWORK

This application claims priority from U.S. Provisional Patent Application Ser. No. 60/518,629 to CASTONGUAY et al., entitled "Method and apparatus for suppression of alarms across network elements", and filed on 12 Nov. 2003.

FIELD OF INVENTION

The invention relates to optical communication networks, and in particular to a method and system for determining the root cause alarm and masking all other non-root cause alarms e.g. for the purpose of fault isolation within a single network element of the network.

BACKGROUND OF INVENTION

A network element in an optical network is subject to intermittent faults that may raise alarms in the system. A single fault in the system can however give rise to multiple alarms detected at multiple points. Finding the root cause alarm corresponding to the fault that has triggered these alarms is important for fault isolation and repair.

In the absence of an automatic fault isolation system, the network operator has to manually go through the list of alarms and identify the root cause alarm triggered by a fault that needs to be alleviated. With a large number of alarms in the list, this can be a long and arduous task. It cannot only overwhelm even an experienced network operator but can also increase the time for the detection of the failure. This in turn can significantly increase the time required for returning service to the network element.

Thus there is a need in the field for the development of an efficient method and system for fault isolation within a network element.

SUMMARY OF THE INVENTION

Therefore there is an objective of the invention to provide a system and method for determining a root cause alarm within a network element in an optical communication system while suppressing other correlated alarms.

A method for fault isolation within a network element (NE) in an optical network, the method comprising the steps of: identifying root cause alarms within the optical network by using a directed acyclic graph (DAG); masking of all remaining correlated alarms within the NE; and displaying said root cause alarms; wherein the DAG represents the NE each vertex in which represents a physical port direction in the NE and edges are directed between the vertices based on the NE topology. The step of identifying root cause alarms comprises the steps of: finding starting vertices in the DAG; pruning the edges of the DAG that are excluded from processing; pruning the starting vertices of the DAG that are excluded from processing; performing a topological sort of the vertices in the DAG; and performing a topological walk of the DAG. The step of finding starting vertices comprises the steps of: traversing the DAG starting from vertices with no incoming edges; and identifying a minimal set of vertices such that each vertex V in the set is associated with a topological fault and any other up-graph vertex that is connected with V, is disassociated with any topological fault. The step of pruning edges comprises the steps of: traversing the DAG from said starting vertices; and marking edges that do not lead to vertices that support topological faults as pruned. The step of pruning starting vertices comprises the step of identifying the starting vertices, all outgoing edges of which are pruned and removing them from any further consideration. The step of performing the topological sort comprises the step of producing an ordering of the vertices in the DAG in such a way that all vertices that are up-graph from a vertex V are processed prior to V. The step of performing a topological walk comprises the steps of: visiting each vertex in the DAG in a topological order; processing a vertex being currently visited if it has a topological fault associated with it; and processing neighbors of the vertex being currently visited; wherein the neighbors of the vertex are the vertices that are reached via a single hop from said vertex. The step of processing the vertex being currently visited comprises the steps of: generating a new mask vector each element in which corresponds to a topological fault type; storing the new mask vector into the mask vector for the vertex being processed, if there is a difference between the mask vector and the new mask vector; updating the nodal masking of faults and adjusting the alarms associated with the condition; and preparing a topological fault information that will be propagated to the neighbors of the vertex being currently visited. The step of preparing the topological fault information comprises the step of processing a vector each element in which records information regarding topological faults of a particular type. The step of processing the neighbors of the vertex being currently visited comprises the step of propagating the topological fault information from the vertex being currently visited to all neighbors of said vertex. The step of displaying said root cause alarms comprises the step of displaying the unmasked alarms.

A method for fault isolation within a network element (NE) in an optical network, wherein the NE has a view of a network topology and Wavelength Tracker data obtained by using Wavelength Tracker technology, the optical network contains optical channel paths, each having a unique signature in a form of a low frequency dither tone modulation called Wavekey, generated by Wavelength Tracker, the method comprising the steps of: identifying root cause alarms in the NE; and displaying said root cause alarms. The step of identifying the root cause alarms in the NE comprises the step of masking non-root cause alarms in the NE.

A system for fault isolation within a network element (NE) in an optical network, the system comprising: means for identifying root cause alarms within the optical network by using a directed acyclic graph (DAG); means for masking of all remaining correlated alarms within the NE; and a display unit for displaying said root cause alarms; wherein the DAG represents the NE each vertex in which represents a physical port direction in the NE and edges are directed between the vertices based on the NE topology. The means for identifying root cause alarms comprises: means for finding starting vertices in the DAG; means for pruning the edges of the DAG that are excluded from processing; means for pruning the starting vertices of the DAG that are excluded from processing; means for performing a topological sort of the vertices in the DAG; and means for performing a topological walk of the DAG. The means for finding starting vertices comprises: means for traversing the DAG starting from vertices with no incoming edges; and means for identifying a minimal set of vertices such that each vertex V in the set is associated with a topological fault and any other up-graph vertex that is connected with V, is disassociated with any topological fault. The means for pruning edges comprises: means for traversing the DAG from said starting vertices; and means for marking edges that do not lead to vertices that support topological faults as pruned. The means for pruning starting vertices comprises a means for identifying the starting vertices, all outgoing edges of which are pruned and removing them from any further consideration. The means for performing a topological sort comprises a means for producing an ordering of the vertices in the DAG in such a way that all vertices that are up-graph from a vertex V are processed prior to V. The means for performing a topological walk comprises: means for visiting each vertex in the DAG in a topological order; means for processing a vertex being currently visited if it has a topological fault associated with it; and means for processing neighbors of the vertex being currently visited; wherein the neighbors of the vertex are the vertices that are reached via a single hop from said vertex. The means for processing the vertex being currently visited comprises: means for generating a new mask vector each element in which corresponds to a topological fault type; means for storing the new mask vector into the mask vector for the vertex being processed, if there is a difference between the mask vector and the new mask vector; means for updating the nodal masking of faults and adjusting the alarms associated with the condition; and means for preparing a topological fault information that will be propagated to the neighbors of the vertex being currently visited. The means for preparing the topological fault information comprises means for processing a vector each element in which records information regarding topological faults of a particular type. The means for processing the neighbors of the vertex being currently visited comprises means for propagating the topological fault information from the vertex being currently visited to all neighbors of said vertex. The display unit for displaying said root cause alarms comprises a means for displaying the unmasked alarms.

A system for fault isolation within a network element (NE) in an optical network, wherein the NE has a view of a network topology and Wavelength Tracker data obtained by using Wavelength Tracker technology, the optical network contains optical channel paths, each having a unique signature in a form of a low frequency dither tone modulation called Wavekey, generated by Wavelength Tracker, the system comprising: means for identifying root cause alarms in the NE; and a display unit for displaying said root cause alarms. The means for identifying the root cause alarms in the NE comprises a means for masking non-root cause alarms in the NE.

BRIEF DESCRIPTION OF THE DRAWINGS

Further features and advantages of the invention will be apparent from the following description of the embodiment, which is described by way of example only and with reference to the accompanying drawings in which.

DETAILED DESCRIPTION OF THE EMBODIMENT OF THE INVENTION

Multiple alarms may appear against many cards in the NE when a fault occurs. The focus here is on alarms that will appear against many cards in the NE when the fault occurs. This invention reduces the number of alarms presented to the user to a minimum set in order to help diagnose the problems. The root cause alarms that correspond to the root cause fault conditions in the system are displayed and all correlated non-root cause alarms within any network element in the optical network are masked.

Tropic Network's Wavelength Tracker technology is useful in monitoring of optical networks that contains optical channel paths. Monitoring of faults that give rise to alarms in the optical channel layer is achieved by deploying Wavelength Tracker. A light path to be monitored on an optical network can be identified by using Wavelength Tracker. The Wavelength Tracker technology applies a unique optical signature to each wavelength (channel) at the Dense Wavelength Division Multiplexing (DWDM) layer. The unique optical signature includes a low frequency modulation of one or more dither tones onto the optical channel, which uniquely identify the optical channel. This optical signature (also called a Wavekey) is applied to the optical channel at the source node of the light path. The optical signature is detectable at intermediate nodes on the light path via inexpensive decoders present on line cards. Detection of the optical signature is accomplished without an Optical-Electrical-Optical (OEO) conversion at intermediate nodes, thus resulting in a cost-effective solution. Wavelength Tracker technology is used for a variety of applications including optical power monitoring and loss of light avoidance. The technology for generating and detecting Wavekeys has been described in U.S. patent application Ser. No. 09/963,501 by Obeda, P. D., et al, entitled "Topology Discovery in Optical WDM Networks", filed on 27 Sep. 2001.

The embodiment of the invention can currently handle five types of topological faults that are listed. Four of these are related to wavelength tracker.

Wavelength Tracker channel absent: this is raised when a channel has been pre-provisioned to carry a particular optical signature and it is not present.

Wavelength Tracker channel unexpected: this is raised when an optical signature has been detected on a channel that differs from the provisioned signature (it may also happen when no provisioning has been set for the channels).

Wavelength Tracker channel collision: optical signatures have channel applicability encoded. When a particular channel is detecting optical signals that identify the same channel, this fault is raised.

Wavelength Tracker channel power out-of-range: the power of the optical signature is outside the provisioned range.

Loss of Light (LOL)—this indicates that negligible power is being detected on the optical receiver.

Note that the first four types of faults are channel aware faults.

The invention focuses on identification of the root alarm that should be presented to the user and masking of all correlated alarms. The technique used for achieving this objective is presented next.

Figure 1:
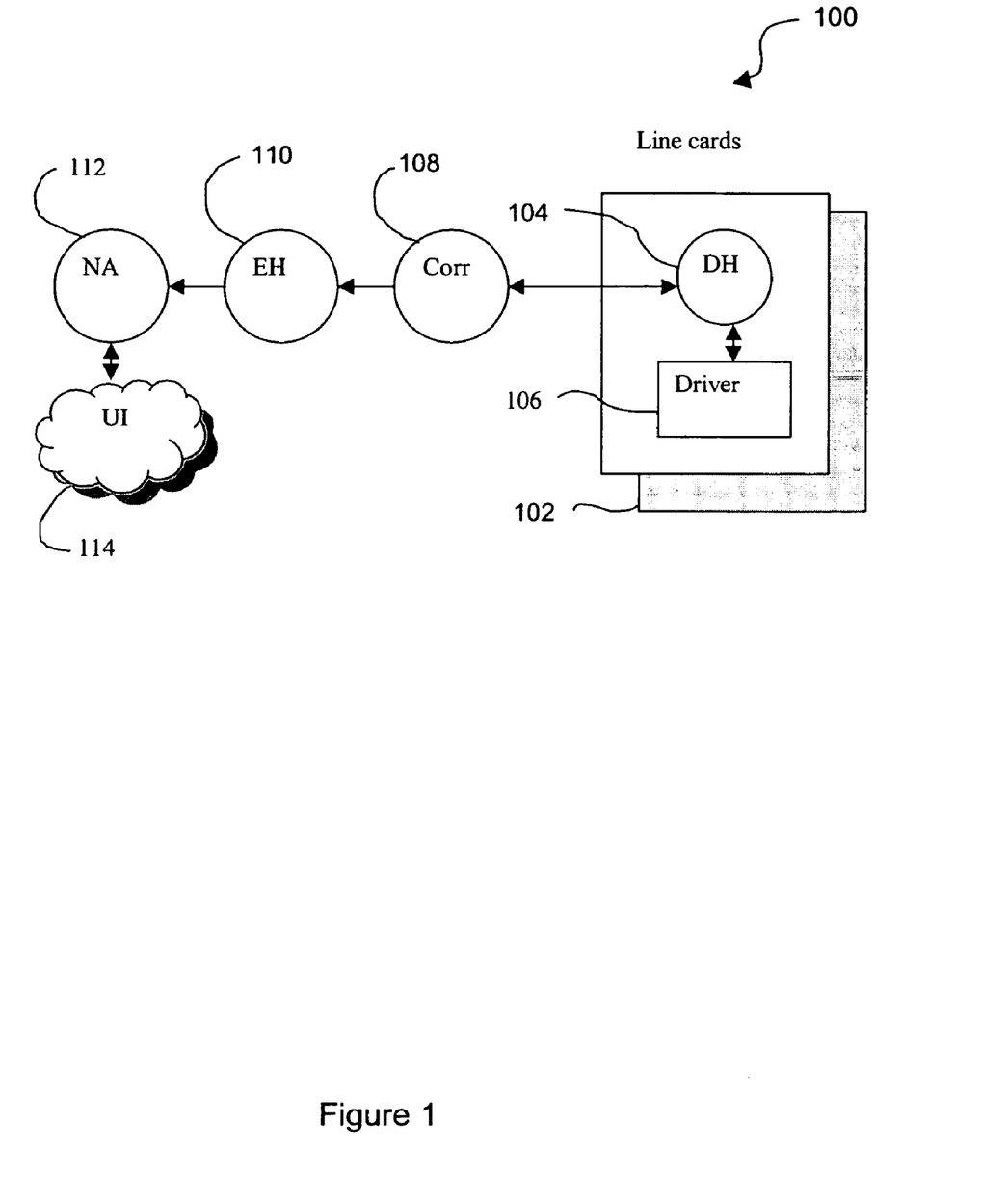
FIG. 1 presents the software processes involved in fault management.

The software processes involved in fault management are shown in FIG. 1 (100). The drivers (106) on line cards (102) abstract the hardware to higher software levels. The defect handler (DH) (104) is responsible for interfacing with the drivers to determine which faults are present and debouncing them. The correlator (Corr) (108) considers these faults and determines what should be presented to the user in terms of alarms. The event handler (EH) (110) is responsible for maintaining the list of active conditions. If appropriate, the node agent (NA) (112) is made aware of these conditions. The user interfacing (UI) (114) subsystems (e.g.

Network Management System (NMS), Command Line Interface (CLI), web CLI) interact with the node agent.

Line card driver's raise/clear defect points in response to hardware and signal state. These defects are mapped into faults. The mapping may be:

one-to-one: for instance, the LOS defect maps to the LOS fault;

many-to-one: for example, various hardware failure defects mapped into a single hardware failure fault; and one-to-many: where a defect may contribute to multiple faults.

The faults are debounced and then sent to the Fault Manager (FM) correlator to determine which fault conditions need to be reported so that the corresponding alarms can be presented to the user. Faults are arranged into a tree structure that represents the hierarchical relationship of the faults. For instance, some framers when presented with no signal will raise alarms for both loss of signal (LOS) and loss of frame (LOF). The LOF is a consequence of the LOS so we would not want to present this to the user.

As faults arrive from the line cards, they are placed in the appropriate place in the card's fault tree and a local tree correlation is performed to determine the ranking of faults which should be reported to the user. The event handler (EV) is interacted with as appropriate to clear existing conditions that have been superceded or cleared as well as raising new conditions or those that have become visible due to a ranking fault clearing. If a newly arrived fault maps to a topological fault, we first perform nodal correlation before interacting with EV. The goal here is similar. On a light-path basis, an alarm due to an upstream fault may mask downstream alarms which are side-effects. For instance, when LOS occurs, there are a number of cards in the light path which detect it. Nodal correlation determines the problem that is farthest upstream and presents the correposnding alarm to the user while masking other correlated alarms. This focuses the user's attention at the detection point closest to the problem and reduces alarm noise. Masking of correlated alarms and displaying the remaining root cause alarms are based on a graph-based approach that is presented next.

The NE is modeled by a directed acyclic graph (DAG) that captures the interaction among various components in the NE. Each vertex in the graph represents a physical port direction (each port has two nodes in the graph, one for each direction) in the NE topology. Edges in the DAG are directed between the vertices based on the NE topology. At system startup, card presence is announced to the fault management system as the cards boot. When the system is informed of the card, vertices and edges are added to the graph as appropriate. Once all vertices for the card have been added, edges are added both for intra-card and inter-card hops. An edge may or may not allow the propagation of a particular optical channel. For each edge e, information regarding propagation of channels is stored in e.allow which is a bit mask representing which optical channels can be propagated through this edge. If a port can detect one or more topological faults, pointers to the associated topological fault definitions are maintained. The port is then said to be associated with these topological faults. Note that an association with a particular topological fault implies that the fault can occur and be detected at this port. The fault is said to be active at the port only on the occurrence of the fault.

Before describing the method of root cause alarm identification, a number of preprocessing algorithms that can reduce the size of the graph and improve the speed of execution of the algorithm for identification of root cause alarm are briefly described. Speed of execution is important so when topological changes occur, we reinvestigate the graph to pre-compute some information that will enable faster fault processing. These pre-processing steps include:

Finding starting vertices—since not every vertex in the graph is associated with topological faults, the goal here is to determine the minimum number of vertices in the graph to start the topological graph walk from.

Pruning edges—again, since not every vertex in the graph is associated with topological faults, we prune off graph branches that do not contain them.

Pruning starting vertices—the pruning of edges may have left starting vertices that are disconnected from the graph. There is no need to consider these since they cannot affect other graph vertices.

Each of these steps is briefly described.

Finding Starting Vertices: While using all vertices with no incoming edges is functionally correct, typical network topologies have a large number of such vertices that can increase the run time of the program used in the embodiment of this invention. This is a speed optimization step used to reduce the starters to the minimum set. The returned starting vertices will always have an associated topological fault and may have a non-zero incoming edges however those vertices up-graph from them have no topological faults.

Figure 2:
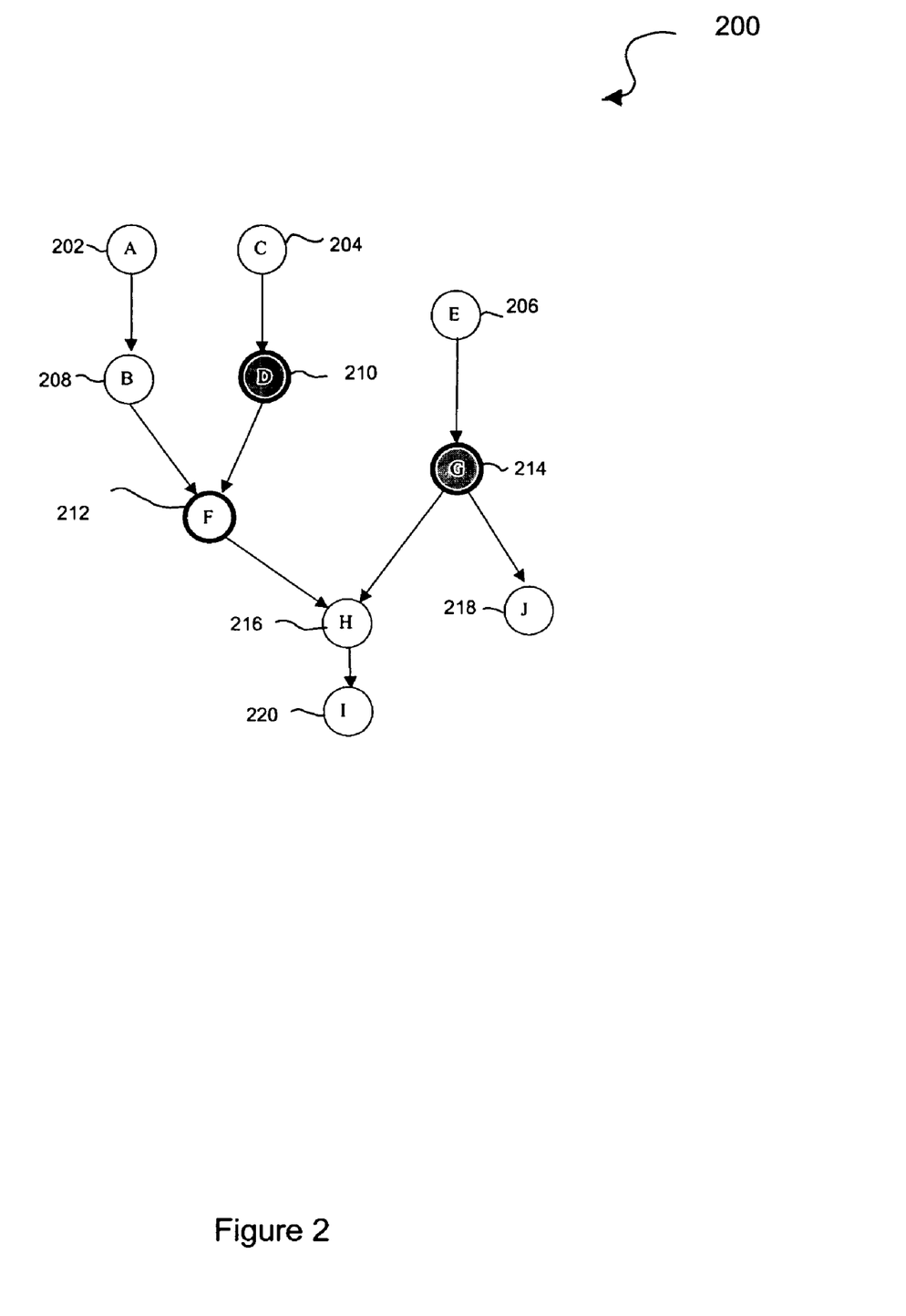
FIG. 2 presents an example graph for demonstrating the execution of various preprocessing steps.

As an example, in the graph shown in FIG. 2 (200). Graph traversal starts with a set of vertices with a zero in-degree and non-zero out-degree (vertices A (202), C (204), and E (206) in the example). Vertices D, F and G that are drawn with dark borders are associated with topological faults. The graph is traversed from each of these vertices. A vertex is added to the set of starting vertices only if all the up-graph vertices that can be reached from this vertex do not have topological faults associated with them. In this example the algorithm will return vertices D (212) and G (214).

Pruning Edges: The goal of this step is to eliminate edges from the topological walk to further reduce the time required for graph search. Typical network topologies have many dead-end branches that slow the topological walk. By marking such edges as pruned (note this does not actually remove the edges from the graph), these dead-ends can be avoided during graph traversals. An input edge for a node that is not associated with a topological fault can be pruned. The pruned edges (312, 314, and 316) for the example graph are shown as dotted lines in FIG. 3 (300).

Figure 3:
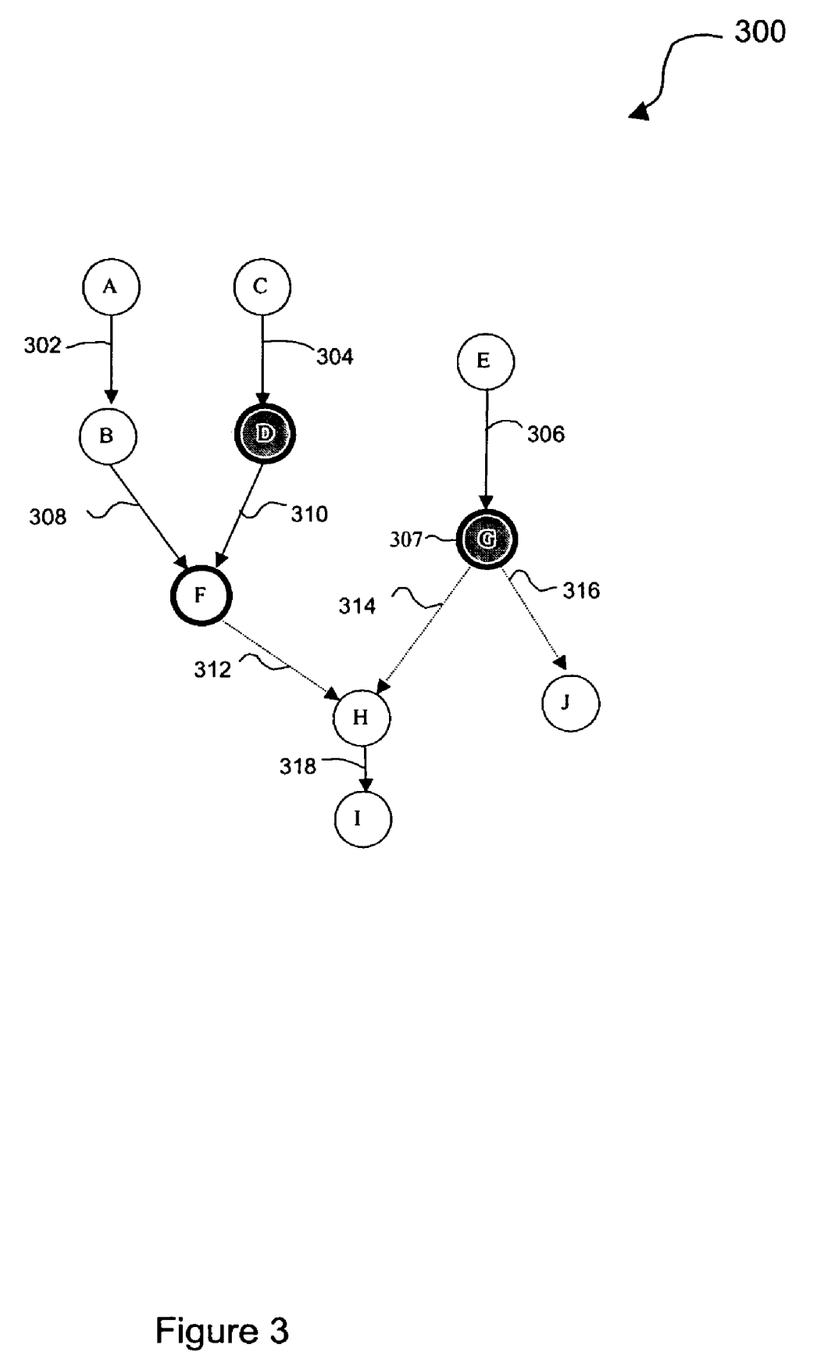
FIG. 3 shows the effect of edge pruning in the example graph of FIG. 2.

Pruning Starting Vertices: The effective graph (the graph actually traversed from starting vertices and ignoring pruned edges when moving to adjacent vertices) for the topological walk is shown in FIG. 3. What we see is that vertex G (307 in FIG. 3) has been orphaned and there is no need to visit that vertex since there is no alarm that can be masked due to a fault at this vertex. This preprocessing algorithm merely iterates across all starting vertices and removes them from consideration if all their outgoing edges have been marked as pruned.

Figure 4:
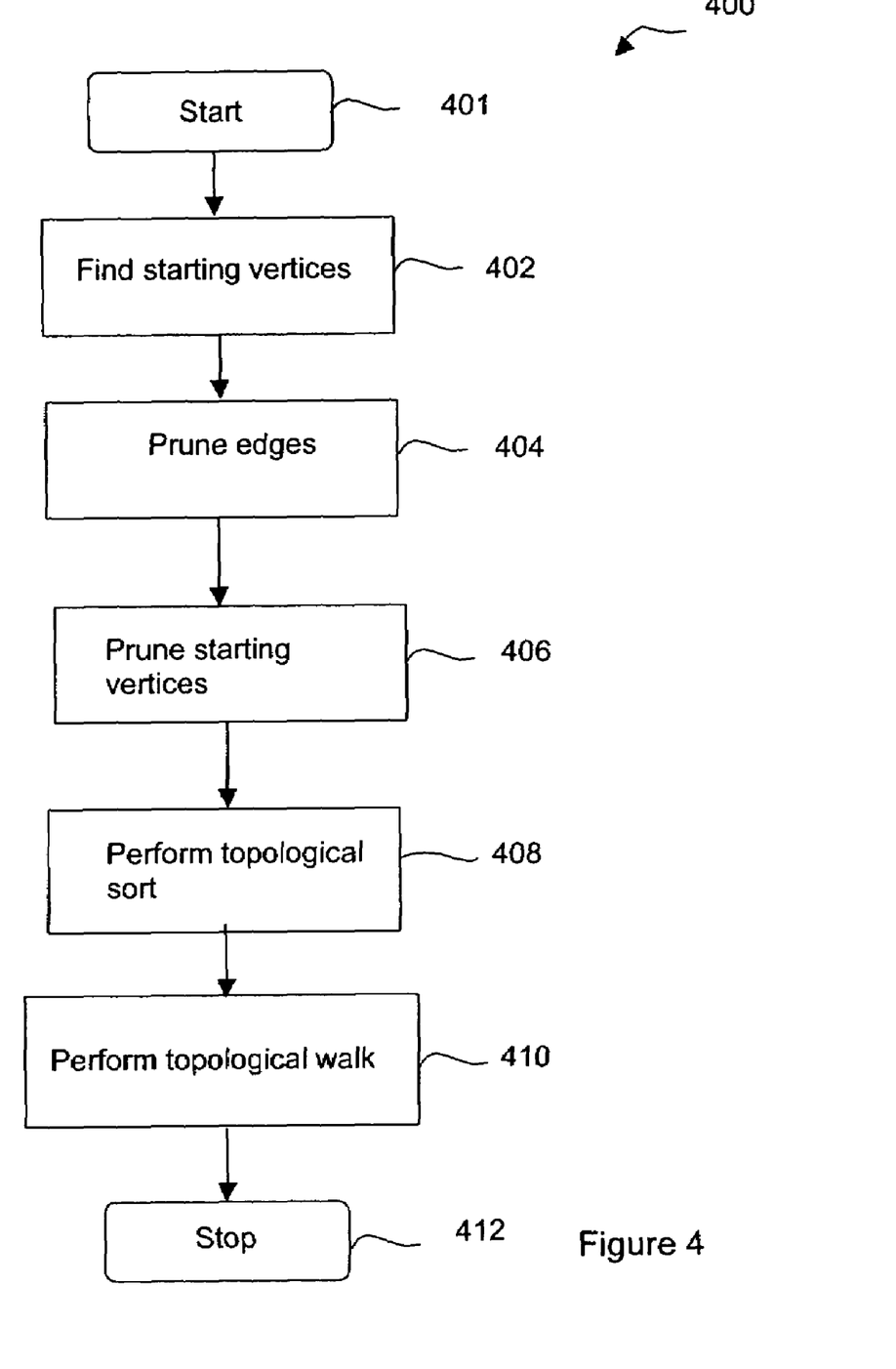
FIG. 4 shows a flowchart that illustrates the steps of the method for fault isolation within a network element in an optical network.

The technique used for achieving the objective of the invention is explained with the help of the flowchart 400 presented in FIG. 4. Upon start (box 401) the procedure determines the staring vertices in the graph (box 402). A starting vertex in the graph is a vertex that is not connected to any up-graph vertex associated with a topological fault. The goal of box 402 is to determine the minimum set of graph vertices from which to do the topological walk from. The resulting starting vertices will always have an associated topological fault and may have non-zero incoming edges but all vertices up-graph from the starting vertices have no topological faults associated with them. Since not every vertex in the graph is associated with topological faults, branches that do not contain them are pruned (box 404). Typical network topologies have many such dead-end branches. By marking edges as pruned, the topological walk can ignore these dead-ends and a significant optimization of run time can be achieved.

The pruning of edges may have left starting vertices (identified in box 402) that are disconnected from the graph. These dangling vertices are removed from the graph (box 406). There is no need to consider these since they cannot affect other graph vertices. The topological walk that performs the masking of non-root alarms requires a topological sorting of the graph that is performed in box 408. Topological sorting techniques for general graphs are well known in graph theory and are applied to the DAG representing the network element. The topological sort assigns a positive integer to each node in the graph in such a way that the numbers associated with up-graph vertices from a given vertex V are smaller than that associated with V. By storing the vertices in order of these numbers in a priority queue (discussed in the next paragraph) it is possible to ensure that all up-graph vertices of V are processed prior to the masking of faults in V. After performing the topological walk (box 410) for masking the non-root alarms, the procedure exits (box 412). Note that steps performed in box 402, box 404 and box 406 are for reducing the size of the graph such that the time required for performing the topological walk is minimized. Operations performed in box 402—box 408 need to be performed only at system initialization and when a change in topology occurs. The topological walk (box 410) is performed whenever a new fault arises.

Figure 5:
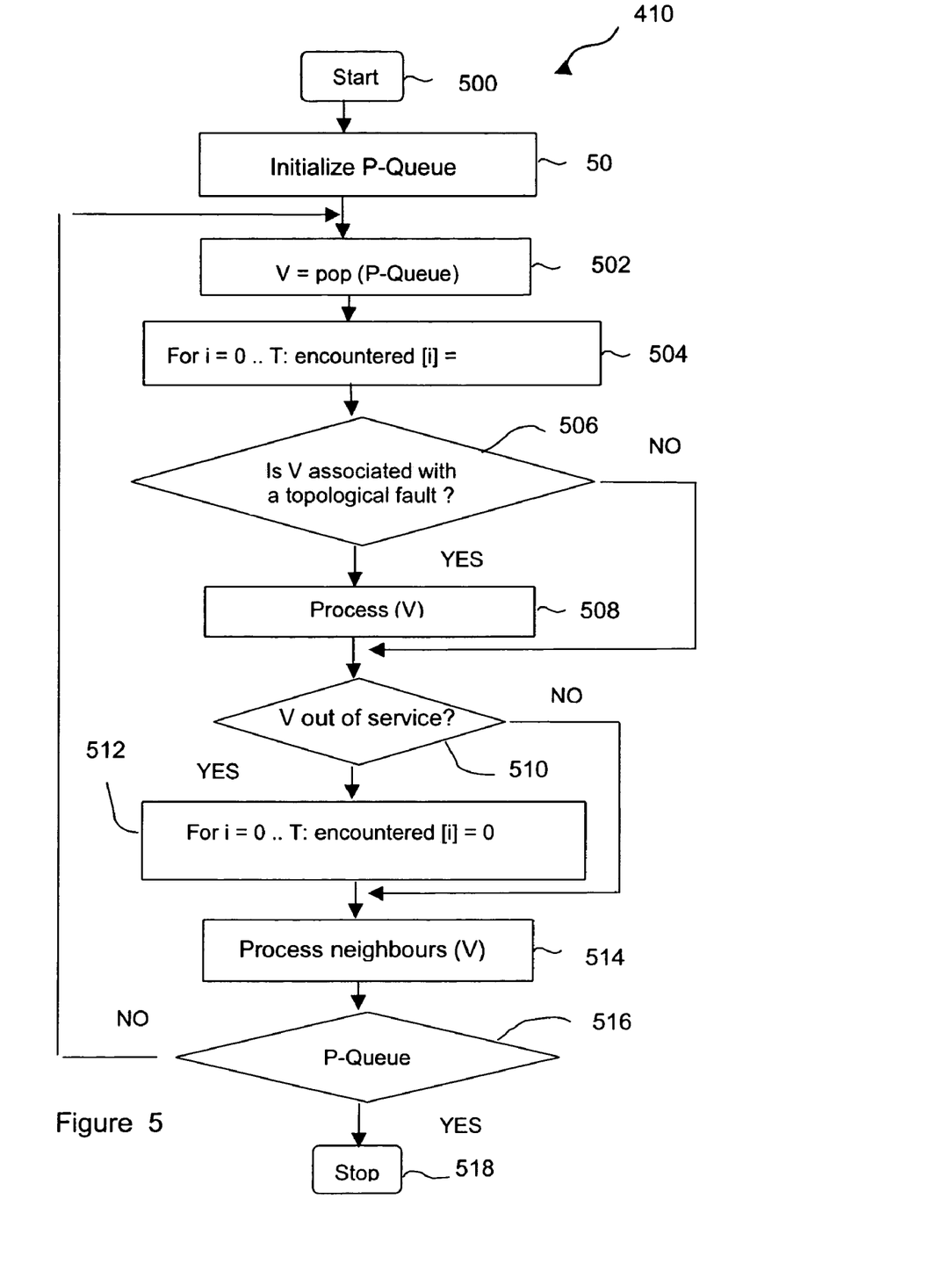
FIG. 5 shows a flowchart that illustrates the step Perform topological walk (410) of the method of FIG. 4 in more detail.

The procedure topological walk (410) is further explained with then help of FIG. 5. The procedure operates on a priority queue called P-Queue that is initialized with the starting vertices obtained at the end of step 406 of FIG. 4. Each vertex V in the graph has a record with two vectors V.encountered [T] and V.active [T]. T+1 is the total number of topological fault types. The index i of each element in these vectors corresponds to a topological fault type. For a channel aware fault the element at position i is a bit mask with each bit representing a particular channel. If i corresponds to a non-channel aware fault such as LOL all bits in the element are set to 1 or 0 simultaneously. If a channel aware topological fault of type i is active on a given channel at a contiguous sequence of vertices up-graph from V the corresponding bit in V.encountered [i] is 1; it is 0 otherwise. If a channel aware topological fault of type i is active at V on a given channel, the corresponding bit of V.active [i] is 1; it is zero otherwise. The non-channel aware topological fault LOL is handled in a similar way except that all the bits in the element are set to 1 or 0 simultaneously.

Upon start (box 500) the starting vertices are pushed in order of the numbers associated with them in a priority queue called P-Queue (box 501). The procedure pops the first vertex stored in P-Queue (box 502). The values stored in the V.encountered vector are then copied into a local vector encountered for further processing (box 504). The procedure checks whether or not V is associated with a topological fault (box 506). If V is associated with a fault the procedure exits YES from box 506 and V is processed further (box 508). Otherwise, the procedure exits NO from box 506. In the next step the procedure checks whether or not V is out of service (box 510). If V is out of service the encountered faults associated with V and all the vertices up-graph from V need not be propagated any further and the elements of the local vector encountered are set to 0 (box 512). This ensures that an alarm due to an out of service fault is not selected as root cause. If V is not out of service the procedure exits NO from box 510. The next step is to process the neighbouring vertices of V (box 514). A vertex is said to be a neighbour of V if the vertex can be reached by a single hop from V. After processing these vertices the P-Queue is checked (box 516). If the P-Queue contains more vertices the procedure exits NO from box 516 and loops back to the entry of box 502 to start the processing of vertex at the head of P-Queue. If P-Queue is empty the procedure exits YES from box 516 and terminates (box 518).

Figure 6:
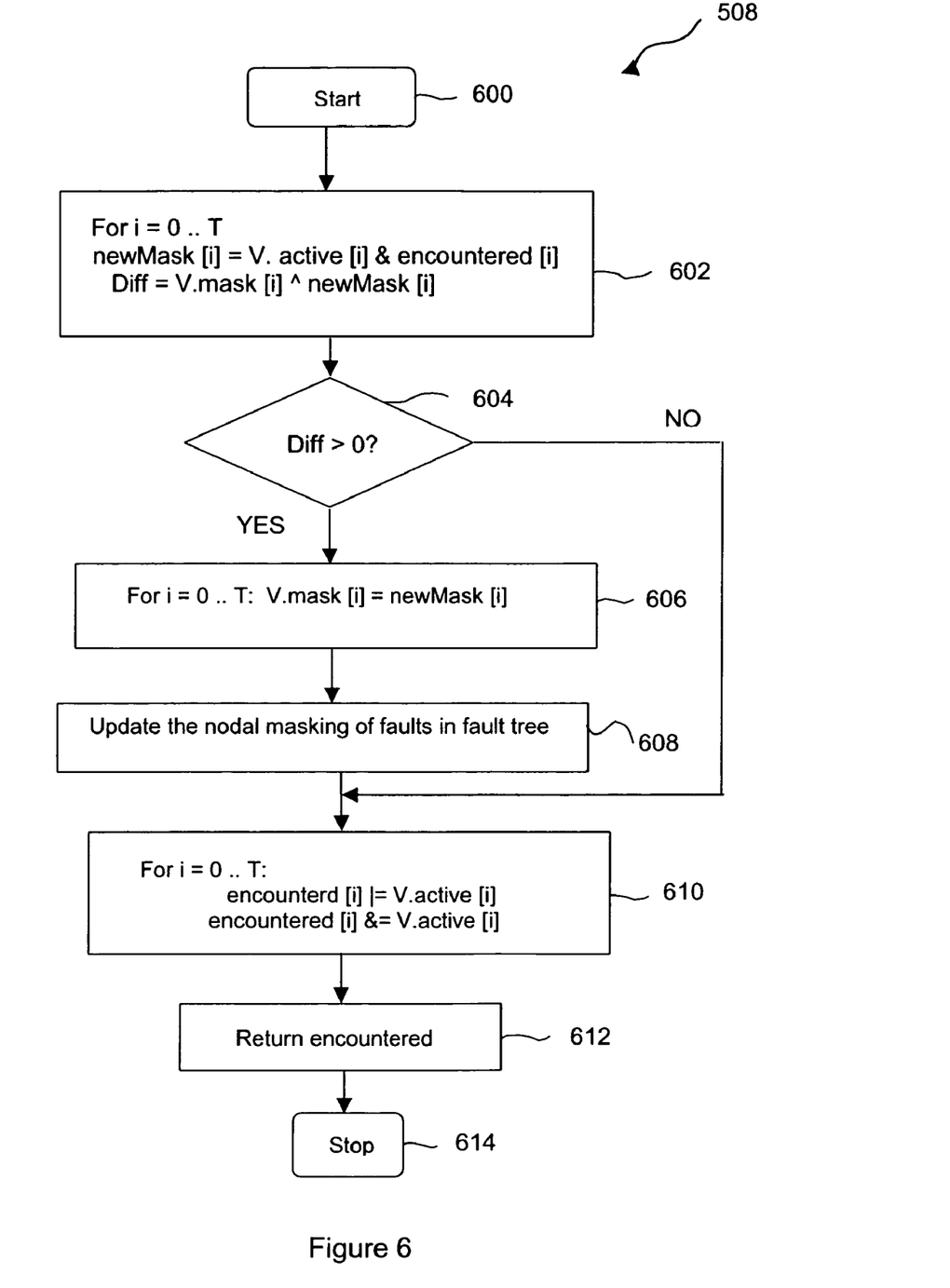
FIG. 6 shows a flowchart that illustrates the step Process (508) of the method of FIG. 5 in more detail.

The processing of vertex V (box 508) is explained with the help of FIG. 6. Upon start (box 600) the procedure performs a bit-wise AND operation between V.active and encountered. If a particular channel aware topological fault corresponding to i is active on a specific channel at V then the bit in V.active [i] that corresponds to the channel is 1; it is 0 otherwise. If i corresponds to a non-channel aware fault such as LOL, all the bits in V.active [i] are set to 1. If a specific bit in encountered [i] is 1 it implies that the same topological fault i is present up-graph from V. The alarm at V is thus due to a non-root condition and needs to be masked. The result of the AND operation is stored in newMask. The difference between newMask and V.mask is computed through a bit-wise XOR operation on these two variables (second step of box 602). Whether or not newMask differs from the current state of the mask at V stored in the vector V.mask is checked in box 604. If there is a difference the procedure exits YES from box 604. The values stored in newMask are then saved in V.mask (box 606). The nodal masking of fault nodes in the fault tree for the vertex is then adjusted (box 608). The alarms associated with the condition are also adjusted in this step. If there is no difference between newMask and V.mask, the procedure exits NO from box 604. The current encountered faults are then updated based on those that are active on the vertex being processed. Those faults that are present are added and those not present are removed from the previously encountered faults (box 610). The procedure returns the values stored in encountered (box 612) and exits (box 614). Note that the after the processing of each vertex in the DAG is complete the remaining un-masked alarms are the root cause alarms that are displayed.

Figure 7:
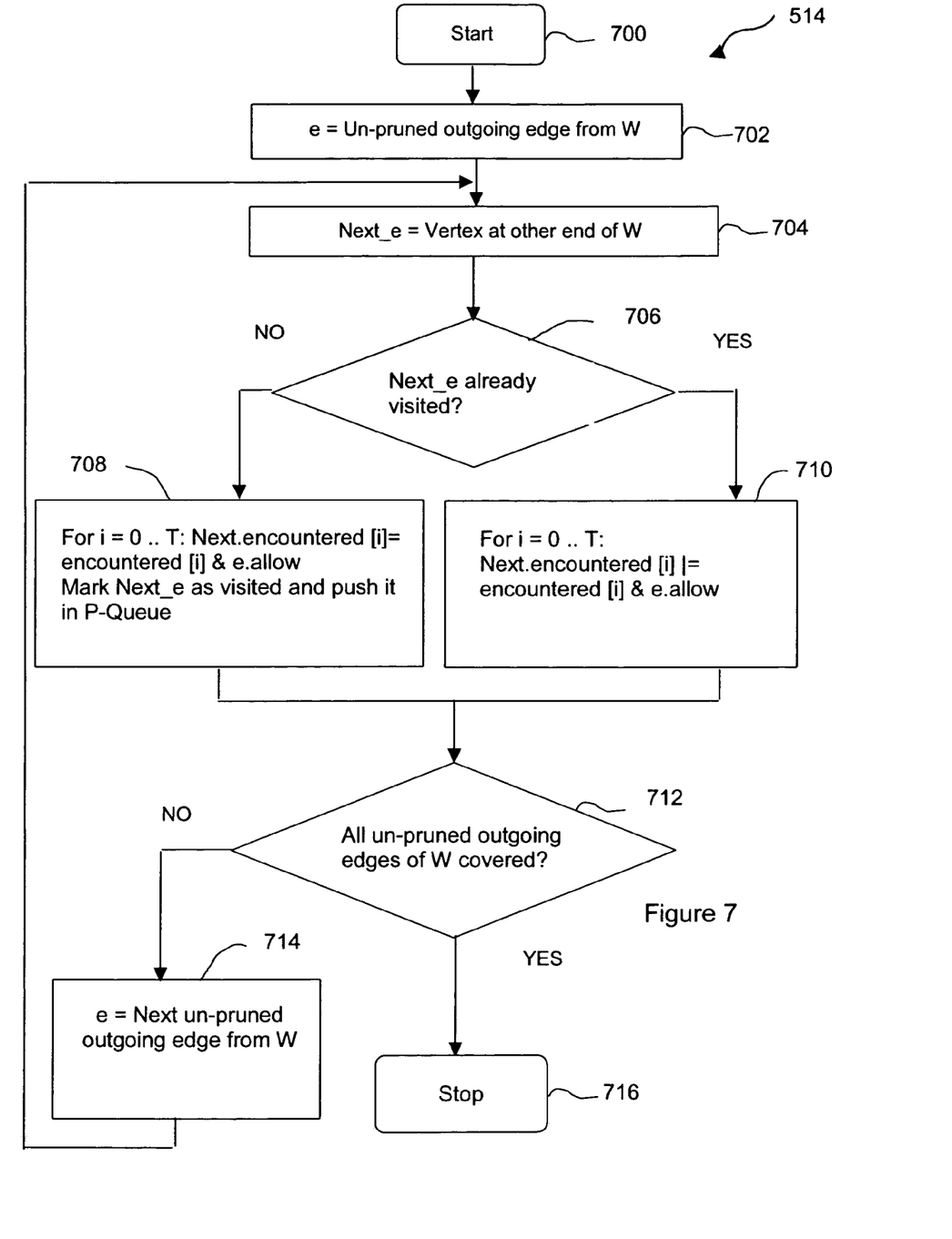
FIG. 7 shows a flowchart that illustrates the step Process neighbors (514) of the method of FIG. 5 in more details.

The procedure for processing the neighbouring nodes of W passed as an argument (box 614 of FIG. 5) is explained with the help of FIG. 7. Upon start (box 700) the procedure stores an un-pruned outgoing edge from W in e. The vertex connected by e to W is stored in Next_e (box 704). Whether or not Next_e has been visited earlier during the topological walk is checked in box 706. If Next_e has been visited earlier the procedure exits YES from box 706 and enters box 710. In box 710, a bit-wise AND operation between encountered [i] and e.allow is performed. Each edge e is associated with a bit mask allow. Each bit in allow represents a channel. If a bit in allow is 1 it means that the corresponding optical channel can be propagated through this edge. Thus, if a bit in allow is 1 the corresponding bits in encountered can be propagated downstream. The corresponding encountered bits are set to 0 otherwise. The result of the AND operation is bit-wise ORed with Next.encountered (box 710). If Next_e is being visited for the first time the procedure exits NO from box 706 and box 708 is entered. By performing a bit-wise AND operation between encountered and e.allow, only those faults that are allowed to propagate are stored in Next.encountered (box 708). The vertex Next_e is marked as visited and is pushed on to P-Queue (box 708). After processing box 708 or box 710 the procedure checks whether or not all the un-pruned edges of W have been processed (box 712). If un-processed un-pruned edges remain, the procedure exits NO from box 712; e is set to the next un-pruned edge from W and the procedure loops back to the entry of box 704. If all the un-pruned outgoing edges from W have been considered the procedure exits (box 716).

The system used in the embodiment of this invention includes a general-purpose computer and hardware interfaces with associated drivers for inputting data related to faults and alarms. The computer has a memory for storing the program that performs the steps of the method for fault isolation within the network element.

Numerous modifications and variations of the present invention are possible in light of the above teachings. For example, various other types of faults relationships can be handled by appropriately characterizing the inter-relationship of these faults. Although the embodiment of the invention described applies to optical networks and Wavelength tracker, we believe that the general methodology for fault isolation described can be extended to wireline and wireless networks as well. It is therefore to be understood that within the scope of the appended claims, the invention may be practiced otherwise than as specifically described herein.

What is claimed is:

1. A method for fault isolation within a network element (NE) in an optical network, the method comprising:
constructing a directed acyclic graph (DAG) based on the NE topology, the DAG having edges connecting vertices, each vertex representing a physical port direction in the NE;
identifying root cause alarms according to steps of:
finding starting vertices in the DAG;
pruning the edges of the DAG;
pruning the starting vertices of the DAG;
performing a topological sort of the vertices in the DAG; and
performing a topological walk of the DAG; and
masking remaining correlated alarms within the NE.

2. A method as claimed in claim 1, wherein the step of finding starting vertices comprises the steps of:
traversing the DAG starting from vertices with no incoming edges; and
identifying a minimal set of vertices such that each vertex V in the set is associated with a topological fault and any other up-graph vertex that is connected with V, is disassociated with any topological fault.

3. A method as claimed in claim 1, wherein the step of pruning edges comprises the steps of:
traversing the DAG from said starting vertices; and
marking edges that do not lead to vertices that support topological faults as pruned.

4. A method as claimed in claim 1, wherein the step of pruning starting vertices comprises the step of identifying the starting vertices, all outgoing edges of which are pruned and removing them from any further consideration.

5. A method as claimed in claim 1, wherein the step of performing the topological sort comprises the step of producing an ordering of the vertices in the DAG in such a way that all vertices that are up-graph from a vertex V are processed prior to V.

6. A method as claimed in claim 1, wherein the step of performing a topological walk comprises the steps of:
visiting each vertex in the DAG in a topological order;
processing a vertex being currently visited if it has a topological fault associated with it; and
processing neighbours of the vertex being currently visited;
wherein the neighbours of the vertex are the vertices that are reached via a single hop from said vertex.

7. A method as claimed in claim 6, wherein the step of processing the vertex being currently visited comprises the steps of:
generating a new mask vector each element in which corresponds to a topological fault type;
storing the new mask vector into the mask vector for the vertex being processed, if there is a difference between the mask vector and the new mask vector;
updating the nodal masking of faults and adjusting the alarms associated with the condition; and
preparing a topological fault information that will be propagated to the neighbours of the vertex being currently visited.

8. A method as claimed in claim 7, wherein the step of preparing the topological fault information comprises the step of processing a vector each element in which records information regarding topological faults of a particular type.

9. A method as claimed in claim 6, wherein the step of processing the neighbours of the vertex being currently visited comprises the step of propagating the topological fault information from the vertex being currently visited to all neighbours of said vertex.

10. A system for fault isolation within a network element (NE) in an optical network, the system comprising:
means for constructing a directed acyclic graph (DAG) based on the NE topology, the DAG having edges connecting vertices, each vertex representing a physical port direction in the NE;
means for identifying root cause alarms comprising:
means for finding starting vertices in the DAG;
means for pruning the edges of the DAG;
means for pruning the starting vertices of the DAG;
means for performing a topological sort of the vertices in the DAG; and
means for performing a topological walk of the DAG;
means for masking of all remaining correlated alarms within the NE; and
a display unit for displaying said root cause alarms.

11. A system as claimed in claim 10, wherein the means for finding starting vertices comprises:
means for traversing the DAG starting from vertices with no incoming edges; and
means for identifying a minimal set of vertices such that each vertex V in the set is associated with a topological fault and any other up-graph vertex that is connected with V, is disassociated with any topological fault.

12. A system as claimed in claim 10, wherein the means for pruning edges comprises:
means for traversing the DAG from said starting vertices; and
means for marking edges that do not lead to vertices that support topological faults as pruned.

13. A system as claimed in claim 10, wherein the means for pruning starting vertices comprises a means for identifying the starting vertices, all outgoing edges of which are pruned and removing them from any further consideration.

14. A system as claimed in claim 10, wherein the means for performing a topological sort comprises a means for producing an ordering of the vertices in the DAG in such a way that all vertices that are up-graph from a vertex V are processed prior to V.

15. A system as claimed in claim 10, wherein the means for performing a topological walk comprises:
  means for visiting each vertex in the DAG in a topological order;
  means for processing a vertex being currently visited if it has a topological fault associated with it; and
  means for processing neighbours of the vertex being currently visited;
  wherein the neighbours of the vertex are the vertices that are reached via a single hop from said vertex.

16. A system as claimed in claim 15, wherein the means for processing the vertex being currently visited comprises:
  means for generating a new mask vector each element in which corresponds to a topological fault type;
  means for storing the new mask vector into the mask vector for the vertex being processed, if there is a difference between the mask vector and the new mask vector;
  means for updating the nodal masking of faults and adjusting associated alarms; and
  means for preparing topological fault information that will be propagated to the neighbours of the vertex being currently visited.

17. A system as claimed in claim 16, wherein the means for preparing the topological fault information comprises means for processing a vector each element in which records information regarding topological faults of a particular type.

18. A system as claimed in claim 15, wherein the means for processing the neighbours of the vertex being currently visited comprises means for propagating the topological fault information from the vertex being currently visited to all neighbours of said vertex.

19. A system as claimed in claim 10, wherein the display unit for displaying said root cause alarms comprises a means for displaying the unmasked alarms.

20. A method of fault isolation within a network element (NE) in an optical network, comprising the steps of:
  (a) marking optical channel paths in the network element with respective unique signatures in a form of low frequency dither tone modulation;
  (b) detecting faults in the NE by analyzing the unique signatures at the physical ports of the network element; and
  (c) identifying root cause alarms among a plurality of alarms caused by said detected faults in the NE by analyzing said faults in the NE using directed acyclic graph (DAG) wherein said physical ports represent vertices in the DAG.

21. A method as claimed in claim 20 further comprising the step of displaying said root alarms.

22. A system for fault isolation within a network element (NE) in an optical network, comprising:
  (a) an optical signature generator for generating unique signatures and marking optical channel paths in the network element with respective unique signatures in a form of a low frequency dither tone modulation;
  (b) an optical signal detector for detecting faults in the NE by analyzing the unique signatures at the physical ports of the NE; and
  (c) a processing module comprising a computer program instructions stored in a computer readable memory for identifying root cause alarms among a plurality of alarms caused by said detected faults in the NE by analyzing said faults in the NE using a Directed Acyclic Graph (DAG), wherein said physical ports represent vertices of the DAG.

23. A system as claimed in claim 22, further comprising a display unit for displaying said root alarms.

* * * * *